Nov. 5, 1968  W. C. BEACH  3,408,790
LIGHTWEIGHT HARNESS
Filed June 14, 1966
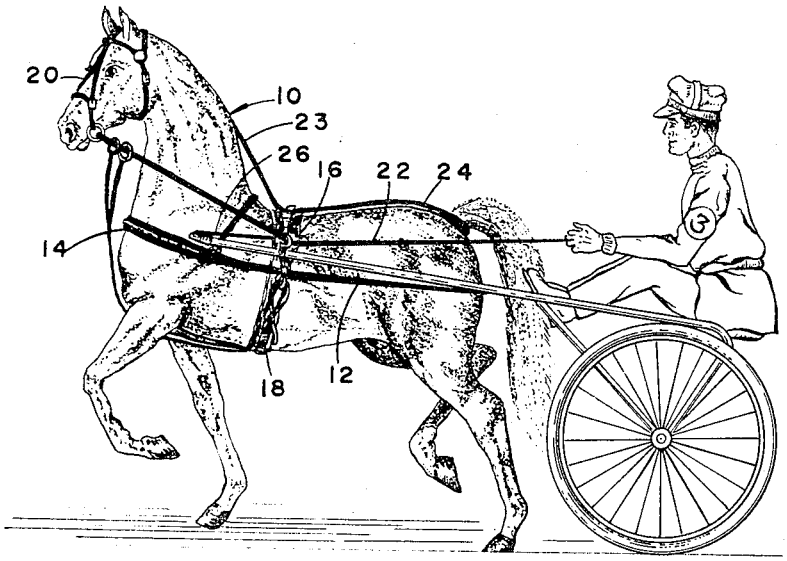
FIG. 1
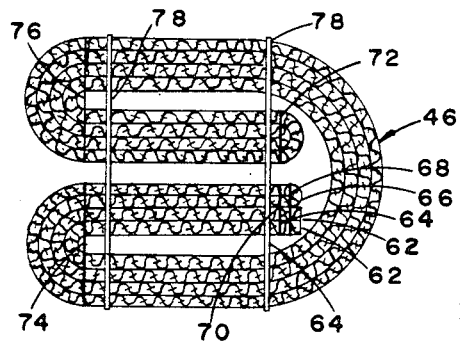
FIG. 10
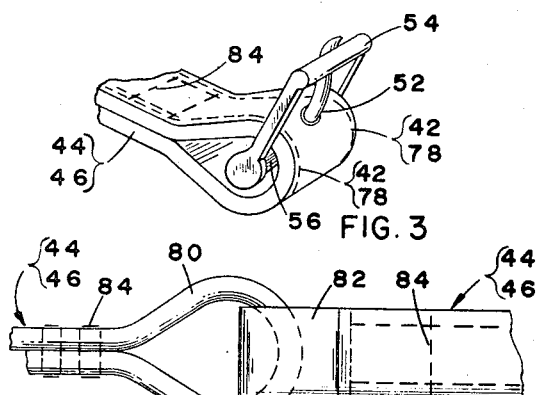
FIG. 3
FIG. 9
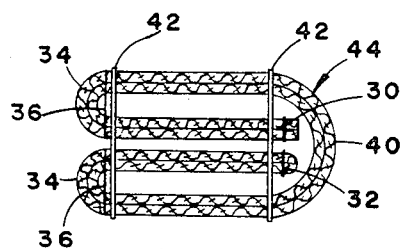
FIG. 2
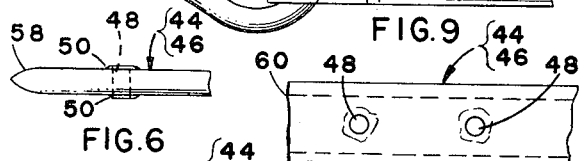
FIG. 6  FIG. 7
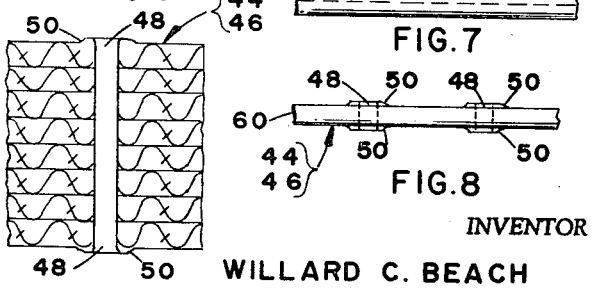
FIG. 5  FIG. 8
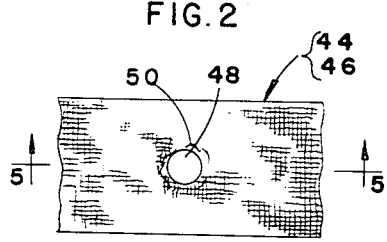
FIG. 4
INVENTOR
WILLARD C. BEACH
BY
ATTORNEY

# United States Patent Office 3,408,790
Patented Nov. 5, 1968

3,408,790
LIGHTWEIGHT HARNESS
Willard C. Beach, Glen Rock, Pa.; National Bank and Trust Company of Central Pennsylvania, administrator of Mary B. and Willard C. Beach, deceased
Continuation-in-part of application Ser. No. 363,118, Apr. 28, 1964. This application June 14, 1966, Ser. No. 557,546
6 Claims. (Cl. 54—2)

ABSTRACT OF THE DISCLOSURE

A lightweight harness item formed from a strip of thermoplastic synthetic resin woven fabric of substantially uniform width folded upon itself a number of times to provide a plurality of plies and the folded product having opposite smoothly rounded edges, said plies being secured firmly together by rows of threads and spaced holes being formed therein by fusion and displacement of fibers of the fabric so as not to impair the tensile strength, and a buckle having a transverse bar and pivoted tongue thereon being connected to one end portion of said harness item by passing the tongue of said buckle through a hole in said item and folding the end portion of the item upon itself and fastening it around said transverse bar of the buckle, whereby the tongue of the buckle may be received selectively in spaced holes in another harness item for connection thereto.

---

This application is a continuation-in-part of application Ser. No. 363,118, filed Apr. 28, 1964, now Patent No. 3,270,488.

This invention pertains to lightweight harness, and, more particularly, to lightweight harness especially adapted for horses engaged in harness racing, but is not restricted to such use.

Since time immemorial, harness for horses of all types and for all uses has been made from leather. Certain elements of harness used on so-called work horses have been made from other materials, such as wood usually reinforced with metal, metal chains, and various items of metal hardware, such as buckles, clevises, guides and loops, etc., but the major portions of the harness have been made from leather.

In order to preserve leather harness in good condition, it must be treated relatively frequently with various types of preserving preparations, such as oils and greases of suitable nature. Even when care is exercised in treating leather harness to preserve it, nevertheless, it is subject to aging and natural deterioration, especially resulting from absorption of moisture, such as rain and the like, but, more particularly, from the sweating of the animals with which it is used.

Another characteristic of leather harness is that, especially to sustain certain tensile stresses to which elements of the harness are to be subjected, it is necessary to have harness elements such as traces, breast bands, saddles and girths which support shafts of the vehicles pulled by the horses, and certain other elements of the harness made from leather, of appreciable width and thickness. As a result, a set of leather harness, in general, is quite heavy. Also, being susceptible to ready absorption of moisture, either from weather conditions or sweating of the animals upon which the harness is used, such absorbed moisture greatly adds to the weight of the harness and, correspondingly, to the load the horse, for example, must carry.

Considering particularly harness of the type used on horses engaged in sulky or harness racing, also known as trotting racing, it is advantageous to use harness as light in weight as possible, thereby enabling the horse, ideally, to devote substantially all of its energy to trotting and pulling a sulky and rider around a track, as distinguished from carrying dead weight on its body in the form of harness. Racing harness of the type commonly employed in trotting racing usually consists of such major items as a bridle, breast collar, traces, saddle, girths, and lines or reins. The major portion of these elements is carried by the horse primarily in the region of its forelegs and upon its head.

In view of the fact that a race horse primarily achieves forward movement through its hind legs, whereas his forelegs primarily simply are for purposes of supporting its head and forward portion of its body somewhat as a prop, it will be seen that, if the weight of racing harness could materially be reduced, especially by a very substantial fraction of the normal weight of leather harness, a horse could employ much more of its energy to secure forward movement than by consuming at least a reasonable portion of that energy to supporting dead weight in the form of harness, A popular commercial type of racing harness made from leather and having the normal metal bracings and other metal hardware items, even though considered to be of a so-called lightweight nature, nevertheless weighs, at the least, approximately 17 lbs, and usually more. It also is possible for such harness to substantially double its weight when thoroughly saturated by rain or perspiration, thereby greatly adding to the burden which a race horse must carry as dead weight, in addition to devoting its energy to propelling its own weight and pulling a sulky and rider.

It is the principal object of the present invention to provide a number of truly lightweight harness items of a strap-like nature in which no leather of any kind is employed. Rather, tensile strength primarily is afforded by utilizing at least 4 plies of fabric woven from synthetic resin fibers or filaments of high tensile strength and stitched together longitudinally to secure the plies into a strap-like strip and sufficiently stiff to maintain certain elements of harness made therefrom in suitable shapes of desired form and said items being connected together by stitched loops and/or buckles without the use of rivets or the formation of holes by severing means such as conventional leather punches which cut fibers when used.

Another object of the invention is to minimize the use of metallic hardware elements in strap-like harness items of the type referred to in the preceding objects, such hardware being substantially entirely restricted to the use of metal buckles and, whereas conventional leather harness usually has holes punched or cut therethrough which actually sever the fibers of the leather and correspondingly reduce the tensile strength of the leather in order to provide holes to receive the tongues of buckles, the present invention contemplates the formation of holes in the strap-like items to receive the tongues of buckles by deforming or displacing certain of the woven thermoplastic synthetic resin filaments or strands from which the fabric is woven, rather than sever them. This preferably is accomplished by pushing a heated pointed element through the plies of the strap-like items which not only rearranges certain of the woven filaments in the vicinity of the hole but, in the event any limited amount of incidental severance of fibers occurs, the heated element functions to melt or fuse such fibers immediately surrounding the hole so as not only to preserve the longitudinal strength of the harness element, but also provides a reinforcement around the hole to insure permanent shape for the hole and thereby facilitate the reception of a tongue of a buckle therethrough.

A further object of the invention is to utilize, in the formation of the various harness elements, fabric made from synthetic resin fibers and filaments which preferably are inherently of a highly moisture-resistant nature due to its having a very low coefficient of moisture absorption and, if desired, the ability of the harness to resist absorption of moisture is further implemented by additional suitable means.

Details of the foregoing objects and of the invention, as well as other objects thereof, are set forth in the following specification and illustrated in the accompanying drawings comprising a part thereof.

In the drawings:

FIG. 1 is a side elevation of an exemplary racing sulky hitched to a trotting horse upon which is mounted a set of harness embodying the principles of the present invention.

FIG. 2 is an exaggerated and somewhat expanded sectional view of one embodiment of strap-like means from which harness items are formed in accordance with the principles of the present invention.

FIG. 3 is a fragmentary perspective view of one end of a strap-like harness item having a buckle connected thereto in accordance with this invention.

FIG. 4 is a fragmentary section of a strap-like harness item having a hole formed therein in accordance with details of the invention.

FIG. 5 is an enlarged sectional view of the item shown in FIG. 4, as seen on the line 5—5 thereof, in exaggerated thickness.

FIG. 6 is a side elevation of a fragmentary end of a strap-like harness item which is stabilized by one embodiment of means comprising part of the present invention.

FIGS. 7 and 8 respectively are fragmentary plan and side elevational views of another embodiment of end structure of a harness item embodying the principles of the present invention.

FIG. 9 is a fragmentary elevation of an exemplary means for connecting 2 strap-like elements together by forming interengaging loops on adjacent ends of the two connected elements, the ends of said loops being secured by stitching to the intermediate portions of the elements.

FIG. 10 is an exaggerated and somewhat expanded sectional view of another embodiment of strap-like means from which harness items may be formed in accordance with the principles of the present invention.

Referring to the drawing, there is illustrated in FIG. 1 an exemplary racing sulky hitched to a trotter race horse upon which is mounted a set of harness formed from elements incorporating the principles of the present invention. It is to be understood, however, that, while the harness comprising the present invention embodies as one of its primary features vastly reduced weight as compared with conventional leather-type harness now in use, whereby it is particularly suitable for sulky or trotting racing horses, other types of harness may be formed from elements made in accordance with the present invention to provide the attending benefits. Therefore, the invention is not to be restricted to racing harness, but is usable, if desired, at least to a large extent, in other types of harness and especially that of a more utilitarian nature than racing harness, due primarily to its lighter weight, greater strength and superior durability in comparison with leather harness.

The set of harness illustrated on the horse 10 shown in FIG. 1 comprises a pair of traces 12, a breast band or collar 14, a saddle 16, a girth 18, a bridle 20, lines or reins 22, a check rein 23, a crupper strap 24, shaft tugs 26 and Martingale 28. All of these elements of the set of harness may be formed substantially entirely from multiple plies of fabric which preferably is woven from synthetic resin fibers or filaments having very great tensile strength in comparison with the cross-sectional dimensions of the same. Certain of these items specifically comprise the subject of co-pending applications in the name of the present applicant. Suitable types of fabrics of this nature are manufactured and sold under such tradenames as "nylon," "Dacron," and the like.

Fabric of this type of a thickness substantially equal to that used in conventional sheeting made from cotton has a tensile strength of approximately 1000 lbs. per inch of width of said fabric. By way of further example, a folded strip of such material ½" wide and comprising 8 plies will sustain a tensile load of approximately 4000 lbs. The cross-sectional dimension of such 8 ply-type material is far less than a strip of conventional leather ½" wide such as used in conventional harness and has a far greater tensile strength than such leather strapping of conventional harness thickness. Stated another way, in comparison with an 8 ply, ½" wide textile fabric strip which will sustain a test load of approximately 4000 lbs., a leather strap made of best grade cowhide would have to be at least five times greater in cross-sectional dimensions.

The various harness members of the exemplary set illustrated in FIG. 1 may be formed from textile-type material woven from synthetic resin fibers and filaments of the type referred to above and folded in various ways to produce different widths and thicknesses, of correspondingly different tensile strengths, depending upon the size and strength required by any particular harness member.

Preferably to attempt to conform to the conventional appearance of leather harness, especially as to width, it is preferred that the various elements of the set of harness shown in FIG. 1, where possible, be comparable to that employed in conventional leather harness. By way of specific example, leather lines or reins usually are approximately 1" wide. Accordingly, several different arrangements of folded fabric may be used to form lines or reins which are substantially 1" in width, but somewhat thinner than conventional leather lines.

One suitable embodiment of cross-sectional construction for strap-like harness members of the type to which this application is directed as described above is shown in exaggerated somewhat expanded manner in FIG. 2. This particular exemplary embodiment is of the type employing 8 plies of so-called tensile material, i.e., material intended to supply tensile strength solely, but preferably also being resistant to the absorption of moisture. A similar suitable arrangement of a band of synthetic resin fabric folded basically the same as shown in FIG. 2 but comprising only a single thickness folded into 4 plies would have adequate tensile strength for purposes of all strap-like elements of the set of harness shown in FIG. 1 but the strap-like elements would not have as much stiffness as normally desired. Hence, an 8 ply configuration is preferred to the 4 ply arrangement for practical purposes.

Referring to FIG. 2 in detail, the first step in the formation of a composite strap-like harness element embodying the present invention comprises folding a band of desired width of textile fabric woven from synthetic resin fibers of the type referred to above once upon itself to form 2 overlapping plies and connecting said plies firmly by parallel rows of stitching 30 and 32 adjacent opposite edges thereof. The opposite edges of said folded doubleply strip are then folded equally and transversely toward each other over the same intermediate surface until they substantially meet. The smoothly rounded, outer folded edges 34 are secured by rows of stitches 36 and 38 adjacent said edges. This provides a 4-ply fabric strip which is then folded upon itself to dispose said folded edges 34 in overlapping relationship and also form an opposite single smoothly rounded outer edge 40. This configuration is stabilized by one or more longitudinal rows of stitches 42 spaced slightly inward from the outer edges of the laminated strap-like strip. The thread or filament used to form stitches 42 preferably is of synthetic resin material of heavier gauge than the filaments from which the fabric is woven so as to provide added tensile strength and desirable stiffness coupled with appropriate flexibility.

The illustration of a folded and stitched configuration of textile fabric, laminated strap-like harness element in FIG. 2 is somewhat diagrammatic in order to simplify the illustration. It will be understood that when the fabric is stitched as illustrated, all of the plies will be compressed into very close and compact relationship with each other, whereby the exemplary products shown fragmentarily in FIGS. 3 and 5–9 nevertheless will be relatively thin and, under normal conditions, less than 1/8" thick. Such product thus will actually comprise at least 4 plies of tensile textile fabric and if such plies, for example, are each 1/2" in width, the composite element will sustain at least 2000 lbs., which is far more than required, for example, for lines or reins employed in racing harness, yet is far less in weight than conventional leather reins or lines of standard size and quality, as well as being far greater in tensile strength than such leather lines and other strap-like harness elements.

Another advantage resulting from forming harness members in the manner illustrated in FIG. 2 lies in the fact that all of the cut, raw edges of the tensile textile fabric material are disposed inwardly of the composite product and only smooth, rounded edges are present on the exterior of the product.

In order to preserve the full tensile strength of the harness member, such as either of the strap-like harness members 44 or 46, especially when forming holes therein to receive the tongues of buckles and the like, for example, one advantage offered by the present invention with respect to the use of preferably thermoplastic textile fabric tensile members or means is that, rather than form holes therein such as by conventional punching or cutting of textile fabric, which decreases the tensile strength, the woven nature of the textile fabric permits the fibers or filaments to be rearranged or displaced by projecting a preferably pointed tool therethrough to form a hole 48 by pushing aside, as it were, the warp and weft fibers or filaments illustrated somewhat diagrammatically in FIG. 4.

When forming holes such as the exemplary hole 48 in the various strap-like harness elements contemplated by the present invention by the means and methods described immediately above, the rearrangement of the fibers and filaments of the woven textile material is accomplished substantially without appreciable rupture or severance of any of said fibers or filaments. However, to further insure substantially no weakening of the tensile strength of such harness members incident to forming such holes therein and also to stabilize the holes, it is preferred that the holes be formed by pushing a heated pointed tool through the assembled plies of textile fabric in the various harness members. By such means, in the event any of the fibers or filaments should become ruptured or severed, the heated tool will effect at least limited melting of the fibers immediately surrounding the hole and thereby restore the fibers or filaments which possibly have become ruptured or severed into a continuous structure which is stable when cooled. Further, such heating of the rearranged or reshaped fibers immediately surrounding and defining the holes causes them to assume a permanent set, when cooled, and a thickened reinforcing enlargement 50 is formed adjacent one or both surfaces of the harness members 46 and 48, as shown in exemplary manner in FIG. 5, thereby stabilizing the shape of such holes.

Such holes primarily are used to accommodate the tongue 52 of a buckle 54, for example, as shown in FIG. 3. The tongue 52 is pivotally connected to the transverse bar 56 on buckle 54. Holes formed in accordance with the manner described above operate satisfactorily with minimum wear being sustained by the perimeters of the holes. In addition to forming holes 48 for receiving the tongues 52 of buckles 54 or the like to mount or connect the buckle to the harness item, it also is to be understood that any of the harness elements which are to be connected to said buckles in adjustable manner likewise may have a series of spaced holes 48 formed therein, by the method and means described above, for cooperation with one of the buckles 54 and receiving the tongue 52 thereof through a selected hole 48 of the strap-like harness element. Under such circumstances, a suitable fabric loop keeper, not shown, is provided to receive the terminal end portion of the harness item projecting beyond the buckle.

Forming the strap-like harness items described hereinabove from textile fabric woven from thermoplastic synthetic resin fibers or filaments offers no disadvantage in forming stabilized ends on the various items. Several exemplary embodiments are shown in the drawing. For example, in FIG. 6, the laminated item 46 or 48 may be finished at the end 58 simply by pinching it between a pair of nipper blades, preferably heated sufficiently to fuse and stabilize the filaments, thereby providing a relatively rigid and durable end structure which is inexpensively and quickly formed.

Referring to FIGS. 7 and 8, the end 60 of item 44 or 46, which is butt shaped, simply is severed from stock or by trimming excess length therefrom by a sharp blade and then engaging said butt end with a heated plate or blade to fuse and stabilize the filaments and solidify the end surface effectively and durably, quickly and inexpensively, without further finishing being required.

A slightly different embodiment of forming an exemplary harness element 46 from textile fabric of the type described above is illustrated in exaggerated, expanded manner in FIG. 10. In this arrangement or configuration, a single band of such textile fabric of desired width is folded upon itself once so as to superimpose the opposite raw edges 62 thereof upon each other to form a double ply arrangement and then secure the same together by a row of stitching 64 shown in exemplary manner in FIG. 10. The opposite folded edge 66 is secured by another row of stitching 68. Said double ply arrangement is then folded upon itself to form 4 plies which arrangement is stabilized by additional rows of stitches 70 and 72 respectively adjacent opposite edges thereof. The stitched edges then are both folded inwardly upon the remainder of the 4 ply arrangement, from opposite edges thereof, substantially into meeting engagement and the resulting edges are stabilized by rows of stitches 74 and 76 adjacent said edges which are well rounded, folded surfaces.

The foregoing 8 ply arrangement then is folded along its median line into the final configuration shown in FIG. 10 and such assembly, when compressed, is fixed in permanent shape by a pair of single or multiple rows of stitching 78. An arrangement of this type will have 16 plies and the thickness thereof is approximately 1/8", thereby being substantially equal to average strap-like items of a set of conventional leather harness with comparable stiffness and shape retention and desired flexibility. Width for width, it will have twice the strength of item 44 and may be used in situations where such greater strength is desired or required.

Further, an exemplary manner of connecting two strap-like elements together, in accordance with the present invention, is illustrated in FIG. 9 wherein it will be seen that similar interconnected loops 80 and 82 are formed simply by folding each strip-like element 44 or 46 upon itself and the ends are secured respectively to said elements by appropriate stitching 84 rather than rivets which would require severing the filaments by cutting rivet holes in the fabric. Similar stitching 84 may be used to form loops of the elements 44 or 46 around the buckle bar 56, as shown in FIG. 3.

From the foregoing, it will be seen that the present invention provides various embodiments of strap-like elements and connecting means therefor which may comprise various items in a set of lightweight harness. These elements are composed substantially entirely of multi-ply fabric arrangements, the fabric being formed preferably from synthetic resin such as "nylon," "Orlon," or the like. Strips of such material are folded in any of several desired configurations described above and secured in permanent form by appropriate stitching or the like. Harness made in such manner is extremely light in weight, especially compared with conventional leather harness, such harness is highly resistant to absorption of moisture so that the weight thereof is not increased to any noticeable extent when contacting sweat upon an animal or during inclement weather, and the tensile strength of all elements of the harness is far greater than comparable leather elements of conventional harness. As a result of using harness of this type, a horse can apply substantially its entire energy to forward movement as distinguished from having to support a substantial amount of dead weight as when fitted with conventional leather harness, even of the so-called lightweight type.

Particularly by eliminating substantially all metal elements from the harness, with the exception of buckles, and especially by eliminating the metallic reinforcing elements, guide rings and hooks normally employed in conventional leather-type saddles, the total weight of a complete set of harness is reduced from at least approximately 17 lbs. or more, which is the weight of conventional leather harness, to less than 4 lbs. when not including the weight of the metallic bit on the bridle in either of these total weights.

While the invention has been described and illustrated in its several preferred embodiments, it should be understood that the invention is not to be limited to the precise details herein illustrated and described since the same may be carried out in other ways falling within the scope of the invention as claimed.

I claim:

1. A lightweight harness item of a strap-like nature fabricated from textile fabric and said item being arranged to be interconnected in cooperative relationship with similar harness items, said strap-like harness item comprisng a band of fabric woven from thermoplastic synthetic moisture-resistant resin fibers of substantial tensile strength, opposite edges of said band being folded upon the central portion thereof in overlapping relationship to form a plural parallel overlying ply assembly and said assembly being folded substantially along the central axis thereof upon itself to form a finally folded assembly of twice as many plies as said overlying ply assembly and all being of substantially even width, whereby opposite edges of said finally folded assembly comprise smoothly rounded folded edges, said finally folded assembly of plies being permanently stitched together with threads of synthetic resin material in close overlapping relationship by rows of stitches respectively adjacent the opposite edges of said assembly and said harness item having holes formed therein between the rows of stitches at predetermined spaced locations by displacing fibers of each ply and fusing the same to form said holes which have a permanent set, a buckle having a tarnsverse bar thereon and a tongue pivotally connected to said bar, and said harness item having an end portion folded around the bar of said buckle and reversely upon itself and secured together to form a loop, thereby to secure said buckle to said strap-like harness item and each loop having one of said holes therein position to receive a tongue of the buckle, said tongue of said buckle also being receivable selectively in spaced holes formed in another of said strap-like harness items for connection thereto.

2. Lightweight strap-like harness items according to claim 1 in which said holes have relatively rigid boundary surfaces stabilizing the same for the reception of the tongue of a buckle.

3. Lightweight strap-like harness items according to claim 1 in which the ends of said strap-like item are fused to stabilize the ends of the fibers of the plies thereof exposed at said ends and thereby prevent ravelling thereof.

4. Lightweight strap-like harness items according to claim 1 in which said threads of said stitches are formed from thermoplastic synthetic resin substantially of the same type as that from which the fabric is woven but of a heavier gauge than the filaments of said fabric.

5. The lightweight strap-like harness item according to claim 1 further characterized by the band of fabric from which said harness item is formed being sufficiently wide to permit the same to be folded into a laminated harness item having 8 plies and a width substantially equal to a similar conventional harness item formed from leather, said harness item comprising a band of fabric initially folded upon itself substantially evenly to form a double ply band and the opposite edges then being folded inwardly upon the same surface of said band substantially into abutting relationhip to form a band of 4 plies having smoothly folded outer edges, said last-mentioned band being evenly folded upon itself to form a laminated strap-like strip having 8 plies an smoothly rounded opposite edges, and said rows of stitches extending along said strip adjacent said opposite edges to secure said plies thereof in fixed laminated relationship and thereby render said strip sufficiently stiff to be capable of sustaining its shape when mounted in operative position upon a horse or similar animal in a set of harness.

6. The lightweight strap-like harness item according to claim 1 further characterized by said band of fabric from which said harness item is formed being sufficiently wide to permit the same to be folded into a laminated harness item having 16 plies and thereby having a thickness and width closely resembling the thickness and width of similar conventional harness items formed from leather, said harness item comprising a band of fabirc initially folded upon itself substantially evenly to form double ply band being folded evenly upon itself to form a opposite edges thereof to stabilize the same and said double ply mand being folded evenly upon itself to form a band of 4 plies, additional rows of stitches extending therealong adjacent the opposite edges to further stabilize the same and the opposite edges of said 4 ply band both being folded inwardly substantially evenly upon the same surface approximately into abutting relationship to provide similar smoothly rounded outer edges also having stabilizing rows of stitches extending therealong to form a laminated band of 8 plies, said latter laminated band being folded upon itself substantially along its median to dispose said rounded edges innermost within a strap-like harness item comprising 16 plies of said fabric which are secured in said finally folded assembly by said rows of stitches which extend through all said plies adjacent the outer edges thereof to provide suitable stiffness and shape retention resembling that of conventional leather harness items of similar width and thickness.

References Cited

UNITED STATES PATENTS

| 2,597,726 | 5/1952 | Hall | 264—154 X |
| 2,764,762 | 10/1956 | Grisanti | 2—322 |
| 2,939,151 | 6/1960 | Cuttler | 2—322 |

HUGH R. CHAMBLEE, *Primary Examiner*.